UNITED STATES PATENT OFFICE.

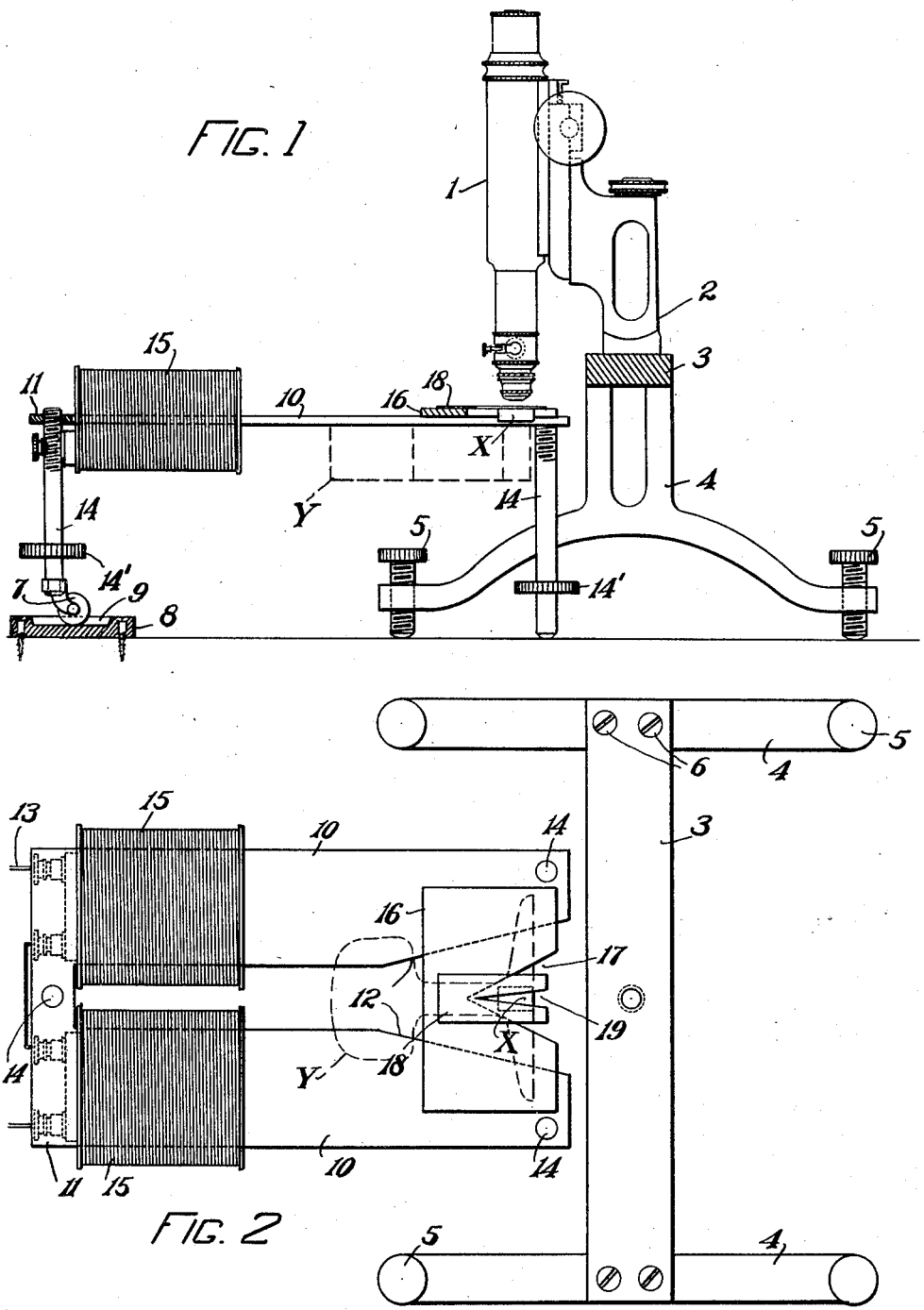

ALBERT SAUVEUR, OF CAMBRIDGE, MASSACHUSETTS.

MICROSCOPE-BRIDGE AND ELECTROMAGNETIC STAGE.

1,007,978. Specification of Letters Patent. Patented Nov. 7, 1911.

Application filed May 20, 1911. Serial No. 628,520.

*To all whom it may concern:*

Be it known that I, ALBERT SAUVEUR, a citizen of the United States, residing at Cambridge, county of Middlesex, Commonwealth of Massachusetts, have invented certain new and useful Improvements in Microscope-Bridges and Electromagnetic Stages, of which the following is a specification.

This invention relates to specimen holders for microscopes and particularly to an electromagnetic holder for heavy metallic specimens used under a high power instrument.

As explained in my former Patent No. 977,842 of December 6, 1910, it is necessary in order to properly examine a piece of metal that the surface be held at a plane accurately perpendicular to the optical axis of the instrument. While it is possible to prepare a specimen with two parallel sides the operation is a difficult one. In handling large specimens certain further difficulties are experienced especially with regard to examining the extended surface of such large specimens.

My present invention relates to constructions for handling these large specimens such as large masses of metal, sections of steel rails and the like.

The structure and use of my device will be more fully disclosed in the specification which follows, reference being had therein to the drawings which form a part of it.

Throughout specification and drawings like reference numerals are employed to indicate corresponding parts and in the drawings:—

Figure 1 is a side elevation of my microscope support and my new independent mechanical stage used with a high power microscope, and Fig. 2 is a plan view of my electromagnetic specimen stage and slide, together with the microscope support.

The ordinary high power microscope 1 is mounted on a standard 2 which is set on the cross piece 3 which forms the bridge connecting the bases 4. Each of the bases 4 is provided with a pair of feet in which are set leveling screws 5.

The stage of my device comprises a U-shaped electromagnet 10 supported by three leveling screws 14 which have milled heads 14¹. The open ends of the magnet 10 are beveled as at 12 to form a gradually widening opening for the reception of specimens of different lengths.

The magnets 10 are provided with the bobbins 15 which are wound to make of the device an electromagnet strong enough to hold heavy magnetic specimens. The windings of the bobbins are provided with suitable binding posts for the connection of the circuit 13. The lower face of the magnet 10 which forms the frame of the stage is flat and forms a true plane which through the leveling screws 14 may be brought to exact right angular position in relation to the optical axis of the microscope 1. If, therefore, a heavy specimen, as for example a section of a rail, indicated at Y, be ground off and polished with one true face, it may be magnetically clamped below the stage and against the lower face thereof. As the field of the high power microscope is very small it is necessary to secure in case of these large specimens a very considerable degree of movement. I have, therefore, provided the bridge-base construction before described for the microscope and provide the electromagnetic stage of such a height that it will freely pass under the arch of the bridge base, thus allowing any part of the specimen held in any part of the stage to be fully and completely observed. By making the ends of the leveling screws 14 rounded the stage may be freely moved and set in any position desired.

In order that smaller specimens may also be examined on the same stage I have provided auxiliary plates. The plate 16 is such a plate having a V-notch 17 in its edge capable of receiving a specimen too short to span the broader opening between the tapered points 12 of the jaws 10. For still smaller specimens requiring a close approach of the objective when using very high power I have provided a thin auxiliary plate 18 and I have shown at *x* a smaller magnetic specimen held to the plate 18 which like the plate 16 lies transversely like the armature or keeper of a horse shoe magnet.

My apparatus is set up on some flat surface, as for instance a table covered with a sheet of glass on which the end of the legs 14 may slip easily. As one end of the casing is supported by a single leg I find it advisable to provide that leg with a swiveled caster 7 and to set the caster in a groove 9 of a plate 8 which is preferably screwed to the table. This plate may be of any suitable length to provide for the free movement longitudinally of the stage 10 so that different parts of a large specimen, such as Y, may be brought under the microscope. The lateral movement of a large specimen, such as Y, is made possible by the swiveling action of the caster 7.

Various modifications in the form, construction and arrangement of the parts of my device may obviously be made, all without departing from the spirit of my invention if within the limits of the appended claims.

What I, therefore, claim and desire to secure by Letters Patent is:—

1. A microscope apparatus comprising a smooth surface base, an independent stage, means for supporting a specimen upon said stage, means for independently and adjustably supporting said stage upon said base, a bridge frame for a high power microscope comprising a pair of bases, means for leveling said bases and an arch adapted to span said stage, and means for mounting the microscope on said bridge.

2. A microscope apparatus comprising an independent stage, means for supporting a specimen upon said stage, means for independently and adjustably supporting said stage, a bridge frame for a high power microscope comprising a pair of bases, adjusting screws for leveling said base and an arch connecting said bases and adapted to span said stage, and means for mounting the microscope on said bridge.

3. A microscope apparatus comprising an independent stage, means for supporting a specimen upon said stage, means for independently and adjustably supporting said stage, a bridge frame for a high power microscope comprising a pair of bases, means for leveling said bases and an arch connecting said bases and adapted to span said stage.

4. A microscope apparatus comprising an independent stage, means for supporting a specimen upon said stage, means for independently and adjustably supporting said stage, a bridge frame for a high power microscope comprising a pair of bases, spaced apart a greater distance than the width of said stage, means for leveling said bases, an arch connecting said bases and of a length sufficient to span said stage, and means for mounting the miroscope on said bridge.

5. An independent staging for a high power microscope comprising a U-shaped electromagnet, a slide on said magnet having a plane bearing surface on its lower face and a notch therein to expose a specimen magnetically held to said slide and means for freely and adjustably supporting said magnet and slide relative to a microscope.

In testimony whereof I affix my signature in presence of two witnesses.

ALBERT SAUVEUR.

Witnesses:
EDWARD N. GODING,
ELLIS SPEAR, Jr.

---

Copies of this patent may be obtained for five cents each, by addressing the "Commissioner of Patents, Washington, D. C."